March 1, 1966   F. J. LUKETA   3,237,337
METHOD OF HAULING A TRAWL NET
Original Filed Dec. 2, 1959   7 Sheets-Sheet 1

Fig. 1.

INVENTOR.
FRANK J. LUKETA
BY
Reynolds + Christensen
ATTORNEYS

March 1, 1966 F. J. LUKETA 3,237,337
METHOD OF HAULING A TRAWL NET
Original Filed Dec. 2, 1959 7 Sheets-Sheet 3

INVENTOR.
FRANK J. LUKETA
BY
Reynolds & Christensen
ATTORNEYS

INVENTOR.
FRANK J. LUKETA

March 1, 1966  F. J. LUKETA  3,237,337
METHOD OF HAULING A TRAWL NET
Original Filed Dec. 2, 1959  7 Sheets-Sheet 5

INVENTOR.
FRANK J. LUKETA
BY
Reynolds & Christensen
ATTORNEYS

March 1, 1966     F. J. LUKETA     3,237,337
METHOD OF HAULING A TRAWL NET Original Filed Dec. 2, 1959     7 Sheets-Sheet 7

INVENTOR.
FRANK J. LUKETA
BY
Reynolds & Christensen
ATTORNEYS

United States Patent Office 3,237,337
Patented Mar. 1, 1966

3,237,337
METHOD OF HAULING A TRAWL NET
Frank J. Luketa, 5567 Greenwood Ave., Seattle, Wash.
Original application Dec. 2, 1959, Ser. No. 856,806, now Patent No. 3,065,562, dated Nov. 27, 1962. Divided and this application Nov. 20, 1962, Ser. No. 238,893
11 Claims. (Cl. 43—4.5)

This application is a division of my prior application Serial No. 856,806, filed December 2, 1959, and entitled Trawler whrch issued as Patent No. 3,065,562, on November 27, 1962.

The present invention relates to trawling, and more particularly to a technique of handling and hauling trawl nets aboard trawling vessels, commonly termed "trawlers."

Trawlers in use in various areas differ in their procedure, and are often differently built, and their equipment is differently installed, because of such procedural differences, and of differences in the kind and amount of the catch which is expected. There are trawlers which operate with towing warps over a single side rail, and trailing thence aft, or there may be two trawl nets, one over each side rail. On the Pacific Coast, however, the normal trawling rig includes towing warps which extend over the respective sides and aft to the outspread wings of a single net, and in hauling, the net is drawn to and and inboard over the stern, rather than hauled over the side, as in the side trawling rig previously mentioned. Until recent years the hauling has been completed by a series of successive strapping operations, using straps about and choking the net and hoisted by a fall line from a boom block overhead, and so hauled in step-by-step onto the trawler's afterdeck. The gear used in this procedure is known as "dandy line gear."

More recently this type of gear has been superseded on the Pacific Coast by gear arranged for drum trawling, whereby the entire net is reeled in, with its floats, weights, tickler chain, chafing gear and all other appurtenances in place, following hauling lines and connected lazy lines, onto the same drum, to conclude the hauling operation. A special winch drum is used for the purpose, connected directly, during hauling only, to the forward portions of the net, usually to forwardly extending net side elements (e.g., divergent wings or curtains), by hauling lines connected to lazy lines which are slack during trawling, after the forward ends of the curtains have been brought to the stern of the trawler. The drum trawling and hauling technique is disclosed and claimed in my application Serial No. 269,691, filed April 1, 1963, now abandoned. The present application pertains to an extension of such technique.

One of the objects of the present invention is to reduce to a minimum the arduous labor heretofore associated with trawling, and to make possible the handling of the lines, nets and other gear to the maximum extent by power means, by employing guides which insure proper guidance of the lines and net from the water over the stern and onto the drum, and by effecting shifting of the drag of the net, during hauling, from a first set of lines to a second set, and shifting of lines and net side elements from one drum to another, all to the end that the hauling operation can be performed within a minimum of time and with minimum likelihood of damage to the net or other gear, and with sufficient flexibility to accommodate situations which depart from the normal.

It is especially an object of this invention to provide a specific variation of the technique, associated with the guides already mentioned, that will avoid interference of the net or other gear with the guides, and will move the guides automatically, or permit their manual movement, out of the way, if such interference becomes or is likely to become severe, yet will enable the restoration of the guide means to proper operative position after the cause of the interference has been cleared or removed.

The drawing shows in some detail the deck and stern portions of a trawler, including the items of trawling gear installed thereon, usable in practicing the techniques of the present invention, and forming the subject matter of Patent No. 3,065,562. The drawing also shows various other items of trawling gear, such as are the subjects of my prior patents or companion applications for patent. For example, the winch illustrated may be like that disclosed and claimed in my U.S. Patent No. 2,954,209, issued September 27, 1960. There are also shown sequential and somewhat diagrammatic views illustrating successive steps involved in the hauling of the trawl net when practicing the techniques of the present invention. The net involved may be of the type disclosed in my copending application Serial No. 362,228, filed April 24, 1964, as a continuation-in-part of my prior, now abandoned, application Serial No. 193,893, filed May 2, 1962, which is a continuation of Serial No. 834,030, filed August 17, 1959, and now abandoned, in which curtains replace the usual wings, by means of the gear of this invention.

FIGURES 5 to 10 are somewhat diagrammatic plan views, similar to FIGURE 2, showing successive operations in the hauling of the net.

FIGURE 7 illustrates the further step of hauling in the sweep lines and curtains, following winding in of the hauling line, upon special hauling-line drums so as to bring the net body close to the stern of the trawler. The guides constrain the lines and curtains to lay properly onto the drums which reel them in.

The drawings show the stern portion of a trawler, the trawler being designed and its gear arranged for hauling in over the stern 80. A winch, generally designated by the numeral 9, is arranged on the deck 8 of the trawler, with its axis oriented athwartwise, that is, transversely to the direction of haul. In this particular trawler, intended for catching bottom fish, there is a rather appreciable distance between the winch and the stern, the winch being located indeed more or less amidship, but this location will depend on a number of other factors, for example, whether the trawler is intended primarily for shrimp trawling, in which case the winch would be well aft of the location shown herein, and similar factors. In any event there is no deck length to spare when the codend is hauled on deck by the winch and the catch is spilled from its after end.

At opposite rails, this being a stern haul trawler, automatic door securing stanchions, the subject of my Patent No. 3,006,097, issued October 31, 1961, and generally indicated by the numeral 7, are supported from the deck and side rails for securement and stowage of the doors D which are a part of or accessories to the net itself. For guidance of the codend B of the net, particularly if it is heavily loaded, from the water surface up and onto the deck, and to insure avoidance of fouling the propeller with the net, a ramp 6 is provided, of suitable construction, such for example as is the subject of my U.S. Patent No. 3,070,916, issued January 1, 1963. This is in general inclined upwardly from the water surface to the top of the rail at the stern. A boom 81 is normally provided capable of extending aft and carrying certain blocks through which are reeved various lines to assist in the different operations, as will be explained more fully hereinafter. One such line M2 is for dragging a try net.

Figure 1:
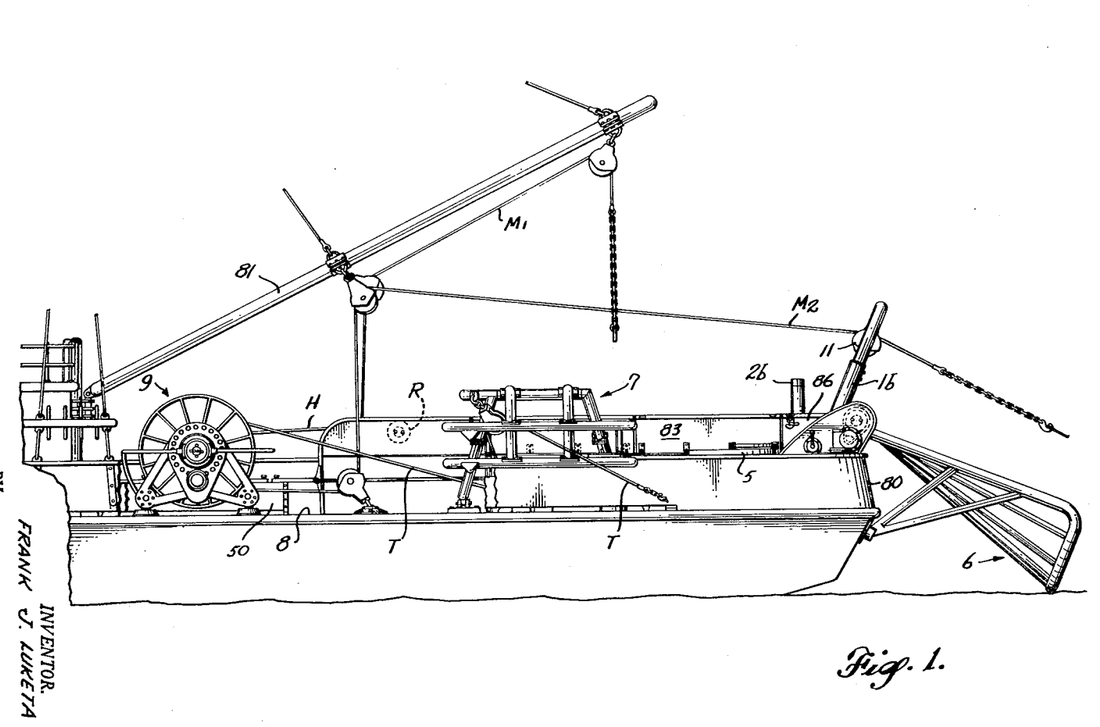
FIGURE 1 is a side elevational view, with part of the near rail broken away, illustrating the stern portion of the trawler.
Figure 2:
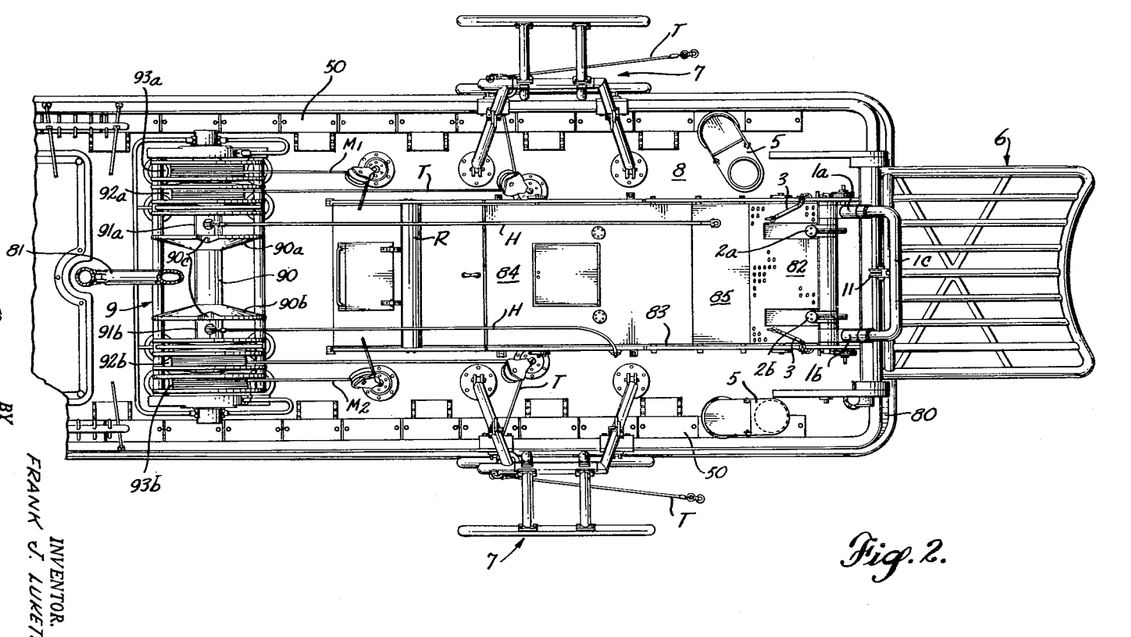
FIGURE 2 is a plan view of the same.

The winch 9 includes a deep and wide central drum 90, which is intended for winding on the after part of the curtains and the net body, and smaller drums 91a, 91b situated alongside and rotatable conjointly with central drum 90. The ends of the central drum 90 are defined by notched and coned flanges 90a and 90b, as in my aforementioned U.S. Patent No. 2,954,209. Winch drums 91a, 91b are preferably operable independently of one another and of the drum 90. They are for reeling in first a pair of hauling lines H, next lazy lines L, and then sweep and curtain lines G and F, respectively, which are bridled together and connected in sequence during hauling to the hauling lines H, and follow in the latter, as is hereinafter described in greater detail. In addition to drums 90, 91a, 91b the winch 9 is normally provided with at least two additional drums 92a, 92a, situated outboardly of drums 91a, 91b, respectively, and operable independently of drums 90, 91a, 91b. These additional drums 92a, 92b are for reeling in the towing warps T, which are connected to the doors D. It is convenient if the winch 9 is also provided with still another pair of drums 93a, 93b (see FIGURE 2, but omitted from the remaining figures), for reeling in lines such as M1, which may be used for general utility purposes, or M2 for handling a small try net (see FIGURE 1, although the try net is not shown), for example.

Since it is not practical to use level-wind mechanism with the drums 91a, 91b to lay the hauling lines and, following them, the sweep lines and curtain lines with curtains attached, it is necessary that guides be provided for aligning these lines as they come in over the stern directly onto the drums 91a and 91b. This guidance is afforded by two generally upright posts paired with one another at each side of the stern. Posts 1a and 2a are paired, and posts 1b and 2b are paired. The paired posts are located close to the stern, spaced laterally so as to lead the lines, etc., to the center line of the respective drums 91a and 91b. It is also desirable that the paired posts be spaced longitudinally as well. The purpose of these spacings will become apparent shortly.

The two posts of each pair are desirably hinged mounted, although it is possible to use posts which are otherwise movable up and down, in use. The posts 1a and 1b are joined by a bridge 1c (FIGURES 2 and 4, for example), so that they pivot alike, but the inner posts 2a and 2b are independently pivotable. Either one may hinge forwardly and downwardly to clear the path for the body and codend of the net being reeled on board. It also facilitates clearance of bulges in the net and the like, whereas the hinging of the outer posts 1a and 1b, also forwardly and downwardly, is primarily for stowage when not in use. The ramp 6 is also swingable upwardly, forwardly and then downwardly, so that it too can be stowed, as shown for example in dot-dash lines in FIGURE 3. This ramp is more fully disclosed in my aforementioned U.S. Patent No. 3,070,916.

Figure 3:
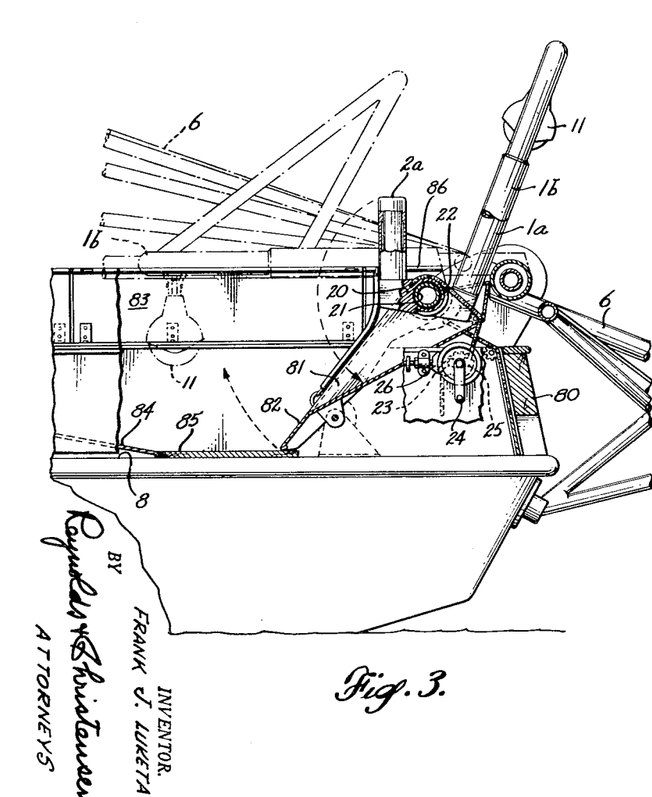
FIGURE 3 is an enlarged scale, longitudinal sectional view, taken through certain guide elements substantially along line 3—3 of FIG. 4.
Figure 4:
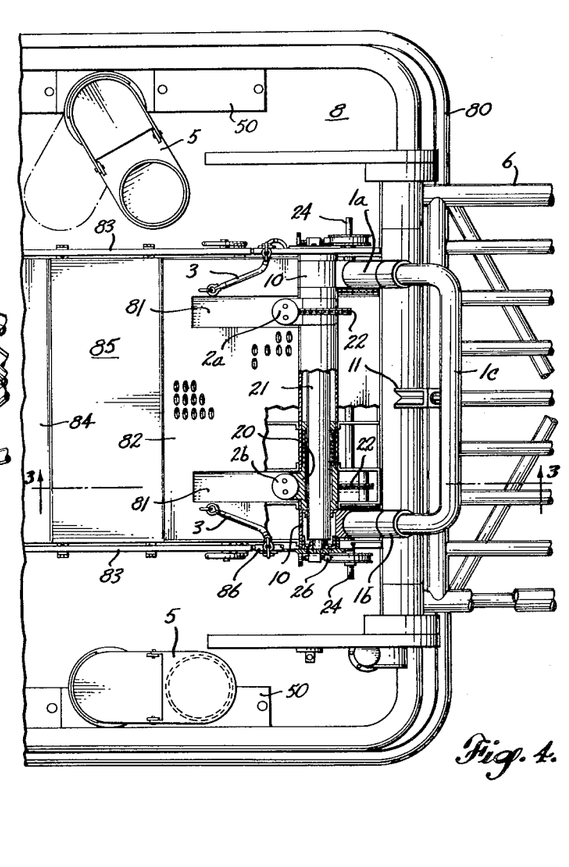
FIGURE 4 is an enlarged scale plan view, partly broken away, showing the guide elements.
Figure 12:
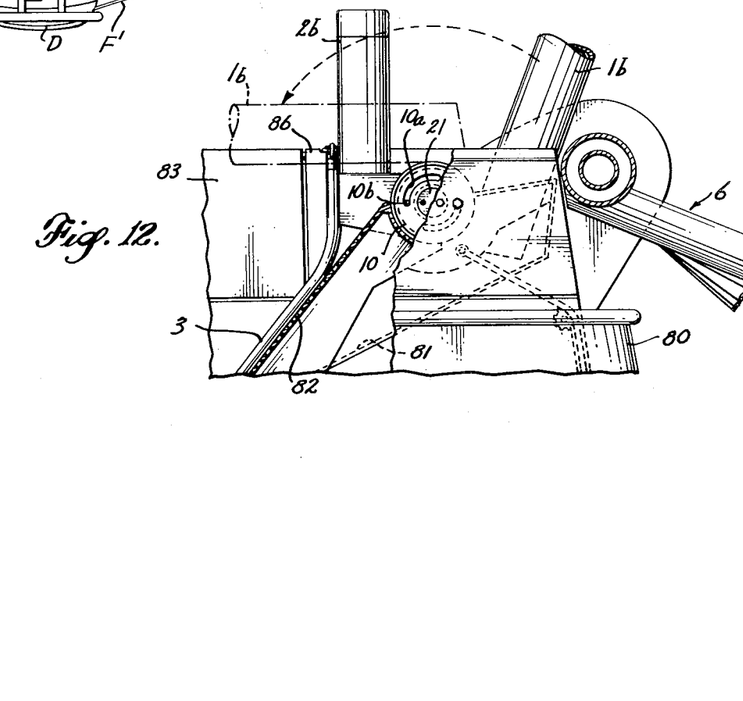
FIGURE 12 is an enlarged, broken-away side elevation of a detail of a pivot mounting for certain guide posts.

Reference to FIGURES 3, 4 and 12 will help to make clear the construction and mounting of the posts and the controls for the same. The posts 2a and 2b are each integral with a sleeve 20 (one for each post) which is rotatably mounted upon a transverse pivot shaft 21 which is fixed at its ends in the walls 86 rising from the deck, the sleeve 20 affording good bearing on the pivot shaft. Each sleeve 20 has joined to it the chain 22 (see particularly FIGURE 3), which after passing over guide sprocket wheels engages a rotative sprocket wheel 23 turnable by a crank arm 24. The chain is held to the sprocket wheel 23 by a fixed guide or cage 25, so that upon rotation of the crank handle 24 in one sense or the other the sleeve 20 is caused to rotate in the corresponding sense, and the corresponding post 2a or 2b will rotate upwardly into an upright operative position, or downwardly into a depression 81 in an inclined and usually perforated plate 82 which likewise pivots around the axis of the shaft 21. The plate 82 has no particular function in relation to the mechanism of this invention, but is described in detail in a companion application Serial No. 215,041, filed August 6, 1962, now U.S. Patent No. 3,184,080, as a continuation of Serial No. 859,389, filed December 14, 1959, now abandoned. A brake 26 can engage the crank 24 or a pulley rotatable therewith, to retain the post 2a or 2b in its upright position, but at a certain stage during hauling these posts must be left free to rotate downwardly.

The posts 1a and 1b are pivotally mounted by sleeves 10 upon the pivot shaft 21 so that they can rotate between a generally upright position, but slightly inclined aft, as shown in FIGURES 3 and 12, and a generally horizontal position shown in the same figures in dot-dash lines. Movement of the posts 1a and 1b can be accomplished by hand, but means are provided to lock them in either of their limit positions, such means being shown in FIGURE 12. The ends of sleeves 10 have part-circumferential slots 10a through which fixedly positioned clamping bolts 10b, fixed in an upright wall 86 rising from and fast to the deck, pass and are adjustable to retain posts 1a, 1b upright or folded down.

It may help in understanding the operation of this invention if it is explained at this point, that there is a trough having the hinged but normally upstanding side walls 83, formed as forward continuations of fixed walls 86, and a bottom plate 84 sloping aft to a level landing 85, the plate 82 previously referred to sloping oppositely also, and more steeply, toward the landing 85. After the codend has been hauled on board, within the trough, the fish are released from the after end of the codend into this trough on deck, and gravitate toward the landing 85 where they are readily engaged by the fish pews of the crew and segregated into the various kinds of fish to be retained or scrap fish to be tossed overboard. Segregation may be accomplished by directing fish into chutes 5, to pass them onto a conveying and segregating system, not necessary to show nor describe here, but housed in at 50. Neither the trough nor the conveying and segregating devices are part of the present invention, but it helps to understand that the codend is released into the trough between the walls 83, and that the fish are initially segregated and directed in the vicinity of the landing 85.

Figure 5:
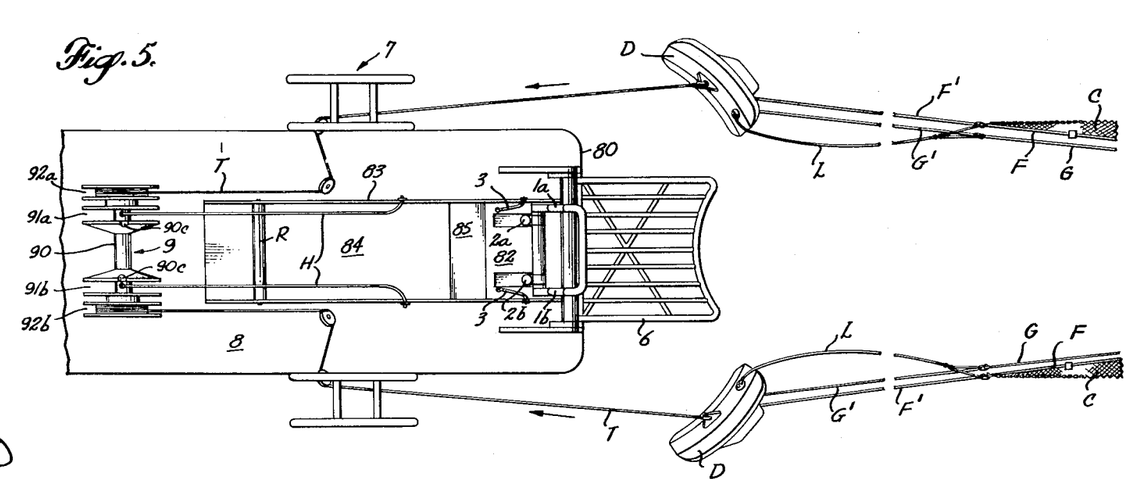
FIGURE 5 illustrates the hauling of the doors close to the stern of the trawler.

Referring now to the sequence diagrams, FIGURES 5 to 10, inclusive, which outline successive steps of the method, FIGURE 5 illustrates the first stage in the hauling of the net. It does not show parts in precisely the relative positions they would actually occupy in use because, in order to conserve space, it has been necessary to somewhat compress the net elements laterally, as well as longitudinally. However, it shows the doors D, forward portions of the net trailing behind the doors, and a first set of lines extending aft of the trawler at each side to the net. This first set of lines include the towing warps T, which are reeled onto the drums 92a, 92b. Whereon they are wound at all times, and which extend aft from the drums 92a, 92b to the doors D; a pair of leg lines F', G' extending aft of each door; a buoyed up curtain line F coupled to and extending aft of each leg line F' to the net body; and a sweep line G, coupled to and extending aft of each leg line G' to the net body. Each lazy line L extends slackly between the door D and the forward ends of the curtain and sweep lines, F, G, respectively, on its side of the net. A pair of haul lines H are anchored to and may be wound somewhat upon their respective drums 91a and 91b. When these lines H are not in use their after ends are conveniently secured near the stern, for instance at the walls 83. Short snubber lines, later referred to, and designated by the numeral 3, are anchored at one end to the trawler as, for example to the plate 82, and at their opposite ends are secured, as to the walls 86.

As previously mentioned, the rig and net elements in the illustrated arrangement, are in accordance with the net disclosed in my aforementioned copending application Serial No. 362,228.

Figure 6:
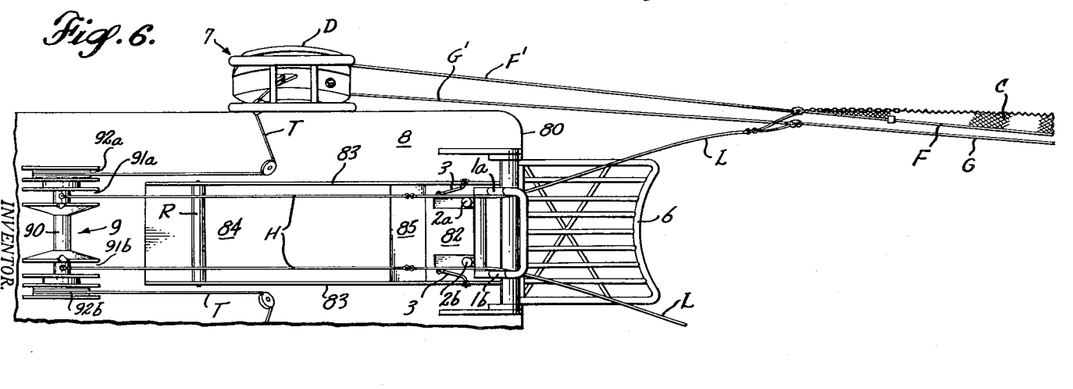
FIGURE 6 shows the first stage of hauling completed, to the extent that the doors are secured to their stanchions, and a lazy line, accessible at this time, has been detached from the door and connected to a hauling line, between proper guides at the stern.

The net assembly is hauled by the first set of lines in the manner indicated in FIGURE 5 until the doors reach and are secured at the stanchions 7, as in FIGURE 6. Their securement may be effected in any suitable manner, for example merely by maintaining the towing warps T taut. The lazy lines L are slack, and their forward ends are now accessible at the doors. Such forward ends are now disengaged from the doors, and are led inboard over the stern 80 between the respective paired guide posts 1a, 2a, and 1b, 2b. The after ends of the lazy lines are connected to the lines F and G at points corresponding usually to the forward ends of curtains C. The lazy lines L and the lines F and G between the forward ends of the curtains and the doors are of such length—not possible to show in the drawing—that each lazy line L when disconnected from the door, at its forward end and led inboard over the stern, extends substantially directly aft between the paired guide posts, over the stern, and downwardly to the points of connection to the forward ends of lines F and G. The disconnected forward ends of the lazy lines are now connected to the near ends of the respective hauling lines H, or if the slack in the lazy lines are adequate, the latter might be connecetd directly to drums 91a, 91b.

The connection of lazy lines L to hauling lines H (or to drums 91a, 91b) completes a second set of lines, including in succession aft, the hauling lines H, the lazy lines L, and the curtain and sweep lines F, G, respectively, extending aft of the lazy lines to the net body. As yet this second set of lines is slack, except for the lines F and G which are part of the first set of lines; see FIGURE 6.

Figure 7:
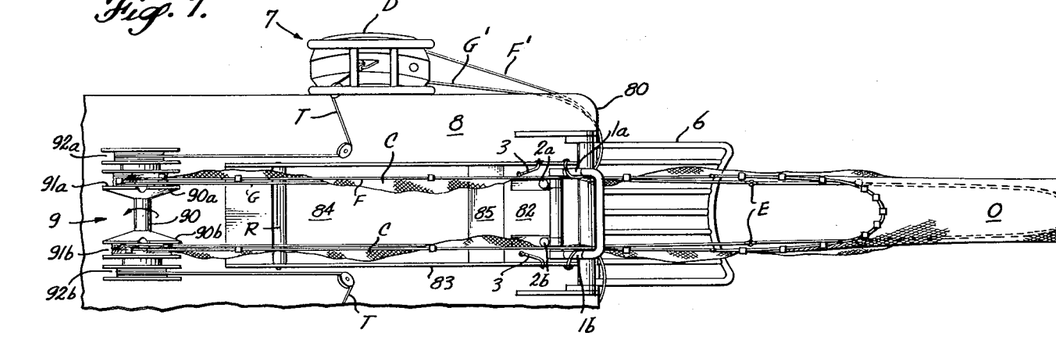
Figure 8:
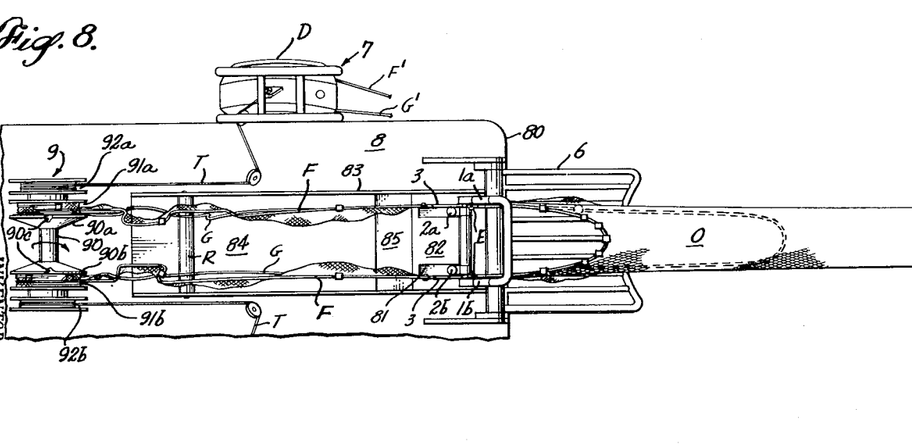
FIGURE 8 is a view showing the operation succeeding that of FIGURE 7, wherein snubbers aboard the trawler are connected to the net body to take the strain, whereby the sweep lines and curtains can be slacked off and transferred to a large central drum, as a preliminary to hauling in the after part of the curtain and the net body onto that central drum.

Now the drums 91a and 91b are operated to reel in the hauling lines H and the following lazy lines L, and so by tensioning this second set of lines to pull slack in the first set of lines, specifically in the leg lines F', G'. Differing now from FIGURE 6, wherein the curtains C were still spread somewhat, the effect of the tensioning of the second set of lines H, L, F, G which are guided between the posts 1a and 1b, is to draw the curtains C of the net closely together and tend to close the open mouth of the net as it is drawn toward the trawler. The paired posts 1a and 2a, 1b and 2b, guide their respective sweep and curtain lines G and F directly onto the drums 91a and 91b which are intended to receive them, and this is true regardless of whether the vessel tends to slew about with respect to the net and so depart from exact alignment with the net. When the forward ends of the curtain and sweep lines F, G, respectively, become accessible, the aft ends of the now slack leg lines F', G' are disconnected from such lines F, G and preferably are then secured in the walls 86, as is shown in FIGURE 7. The hauling proceeds through the second set of lines, now independent of the first set except for the lines F and G (which are now part of the second set), and eventually the overhang of the net body designated O, begins to ride up the ramp, as is about to occur in FIGURE 7. Now eyes E in the sweep lines G are accessible (there may be similar eyes in the curtain line F), and the snubbers 3 are brought into operation for the purpose of taking the tension of the net and allowing the sweep and curtain lines G, F to be slacked back from drums 91a, 91b, as they are shown slacked in FIGURE 8. The purpose of this is to have the lines F, G slack enough that these lines and the after part of the curtains C that are suspended from line F, may be transferred from the drums 91a and 91b, now quite well filled, onto the larger central drum 90. The flanges between drums 91a and 91b, and drum 90, are notched at 90c (see FIGURE 8). One advantage of transferring from the nearly filled drums 91a and 91b to the empty drum 90 is that greater mechanical advantage can be obtained to pull in the most heavily laden portion of the net body, namely, the codend filled with fish, up the incline of the ramp 6 because of the better leverage thus afforded. Also the transfer is made because the net proper, with its heavy twine, chafing gear, etc., is of much greater bulk and needs a larger drum. A discussion of the advantages to be gained by transferring the net from the drums 91a, 91b to drum 90 is also contained in my pending application Serial No. 248,452, filed December 31, 1962, as a continuation-in-part of my prior, now abandoned application Serial No. 836,636.

Figure 9:
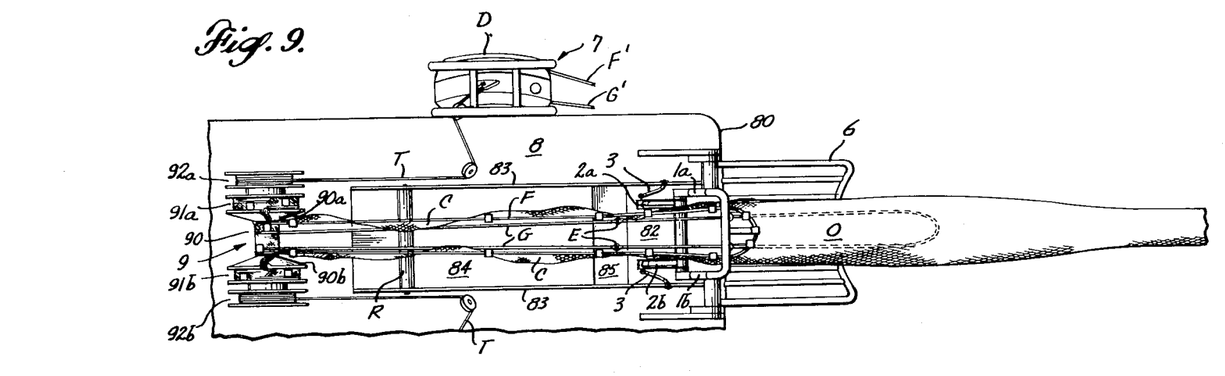
FIGURE 9 shows a step slightly later than that of FIGURE 8, wherein the snubbers have been disconnected from the net, after transferring the sweep lines and curtain lines to the central drum, hauling in, and tensioning the same, and beginning the hauling of the net body aboard the trawler.
Figure 10:
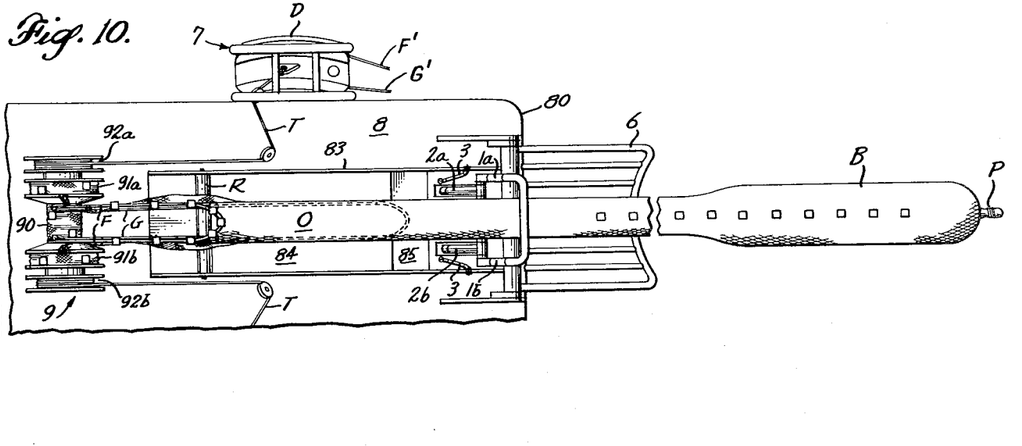
FIGURE 10 illustrates nearly the final step, when the forward portion of the net body is hauled aboard and is about to be wound onto the central drum, which eventually will bring the codend on board.

Once the transfer has been effected onto the drum 90, as in FIGURE 9, it only remains to haul in the net body. However, since the lines F and G running to the upper and lower bosoms of the net are externally of the posts 2a and 2b, and hence the bosoms cannot pass these posts, these two posts are depressed, as by being turned downwardly manually, or they can be pulled down by contact of a bosom with them. They are shown in FIGURES 9 and 10 in the down position. After the lines F and G reassume the tension of the net body, running now onto the drum 90, the snubbers 3 can be disconnected from the eyes E and parked again, as they are shown in FIGURE 9. The net is now hauled in over the ramp 6 and into the space between the walls 83, the net winding onto the drum 90 and the cones 90a, 90b urging the net away from the notches 90c. The resumption of hauling in is shown in FIGURE 9, and in FIG- URE 10 the codend or bag B is shown about to be hauled up the ramp, with the overhang O about to wind onto the drum 90. When the bag B is on deck the cod line or purse line P is released and the catch is emptied out the after end of the bag or codend, into the trough between side walls 83.

When the net is to be reset, which usually will be done immediately, the cod line P having been retied, the codend is drawn aft by use of the try net line M2 through block 11, or in any other suitable manner, and the operations of hauling in are repeated but in reverse succession. The setting is accomplished with a minimum of labor and quickly, and the crew can now apply itself to segregating and disposing of the catch.

Figure 11:
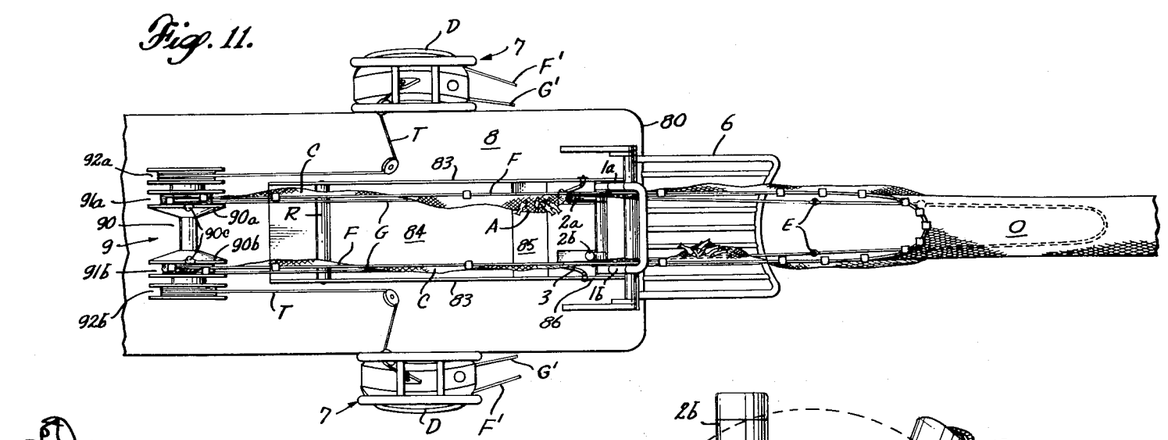
FIGURE 11 is a plan view which illustrates a special condition where numerous fish are caught by their gills in the curtains, obstructing passage of the curtains between laterally slightly spaced paired guide elements, and illustrating how one of the guide elements is thereby automatically or manually displaced to avoid damage to the net or to the gilled fish.

It will be evident that if there is any obstruction to the net pulling past the posts 1a and 2a, or the opposite post of each pair, any such obstruction may not be able to pass between the paired posts, notwithstanding that they are spaced apart sufficiently longitudinally to allow a reasonable obstruction to snake its way between them. For instance, there may be gilling of fish in the curtains, as is indicated in FIGURE 11, that is to say, fish instead of avoiding the curtain and entering finally the codend B, try to escape through the curtain and are caught by their gills. A heavy group of gilled fish, such as that shown at A in FIGURE 11, may not pass between the posts 1a and 2a, and might tear the net in trying. In such a case, it is normal to vary the method somewhat, by having the crew member who is at the stern, at starboard, watching the haul, turn down the post 2a until the group of gilled fish at A has passed the post. He would then find it difficult, ordinarily, to shift the curtain and the tensioned sweep and curtain lines G, F at this starboard side of the net laterally sufficiently to raise the post 2a again, inboard of the curtain and sweep lines. If this is the case, the vessel is maneuvered into a starboard turn, pulling the lines at the starboard side against the post 1a. Now the post 2a may be lifted. The lines at the port side are not affected by this maneuver for the reason that they are still held between the upraised paired posts 1b and 2b. Either post 2a or 2b can be rotated downwardly out of the way independently of the other such post. Obviously if the posts 2a, 2b were to be connected to swing downwardly together (when the above gilled condition presented itself) rather than independently, it would be virtually impossible to guide both hauling lines correctly; one would always remain unguided, and the hauling operation would be most difficult.

Now with the gilled fish F removed the hauling continues as before, and there may be several groups of gilled fish which may have to be disengaged in the same way.

There is a roller R supported between opposite trough walls and elevated above the bottom of the trough near its forward end, over which all lines such as H, L, F and G, the curtain C, and the net body, run. The codend B, when the net body is hauled fully aboard, also extends over the roller R. Its purpose is to elevate the codend as much as possible in its forward portion, so that when the cod line P is released the catch will spill aft from within the net, towards the landing 85 at the deepest part of the trough, where stand the crew members who segregate the fish. Otherwise the codend would not clear readily. When not fishing the entire net is kept wound upon drums 90, 91a and 91b.

In the claims the term "net line means" is sometimes used to describe those lines extending rearwardly of the doors to the net. In the embodiment of the invention, which is illustrated and has been described, such line means consist of leg lines F', G', curtain lines F and sweep lines G. Also, guide posts 2a, 2b are termed "inboard" guide posts, and guide posts 1a, 1b are termed "outboard" guide posts.

From the foregoing, further equivalents, modifications and variations as to the trawling techniques and usages of the trawling equipment will be apparent to those skilled in the art to which the invention is addressed, within the scope of the following claims.

I claim as my invention:

1. A method of hauling a trawl net that includes a body portion of netting and side members of netting connected to and extending forwardly of the body portion, onto a winch aboard a trawler, having a central drum for reeling in the body portion and concentric outboard drums for reeling in the side members, said method comprising hauling the side members onto the respective outboard drums until only the aft portions of the side members are left, and the body portion is accessible, snubbing the respective sides of the body portion to the trawler, to assume the strain of the body portion, and slacking back on the side members, transferring the aft portions of the side members onto the central drum, releasing the snubbed body portion, and completing the hauling in of the aft portions of the side members and the following body portion onto the central drum.

2. A method of hauling a trawl net that includes a body portion of netting and side members of netting extending forwardly at the opposite sides of the body portion, onto a winch aboard a trawler which has a central drum and two outboard drums at the opposite ends of the central drum, by means of a first and a second set of lines at each side alternately connected between the winch and the body portion, and with which the side members are connected, which method comprises: hauling the body portion by the first sets of lines until a slack portion of each second set, anchored to an element of the associated first set at its forward end and to the net at its after end, is accessible from the trawler; disconnecting the forward ends of such slack portions, and leading the same inboard over the stern to a connection to the corresponding outboard drum, to extend thence substantially directly aft to the net; hauling in the net by the second sets of lines to pull slack in the first sets; snubbing the second sets of lines from the trawler; shifting the slack portion of the second sets, and the side members connected thereto, to lay the same onto the central drum; and continuing to reel in the side members, the second sets of lines, and eventually portions of the net body portion onto the central drum, meanwhile releasing the second set of lines from the snubbing, so that their hauling in is permitted.

3. A method of hauling a trawl net that includes side members of netting extending forwardly at the opposite sides of a net body, onto a winch aboard a trawler which has a central drum and two outboard drums at the opposite ends of the central drum, by means of a first and a second set of lines at each side which incorporate a common portion extending from a point intermediate the ends of the lines and adjacent the forward ends of the side members aft to the net body, for support of the side members, and separate forward portions which extend from such point forwardly, which method comprises: hauling the net body by the first set of lines, each second set including a slack portion which extends forwardly to an intermediate point ahead of the point first mentioned, until the forward end of the slack portion is accessible from the trawler; disconnecting the forward end of the slack portion of the second set at each second-mentioned point, and leading the same inboard over the stern to a connection to the corresponding outboard drum, to extend thence substantially directly aft to the net, and to support the side members; continuing the hauling in of the net body and the side members onto the outboard drums by the second set of lines, which now includes the formerly slack portion and the common portion of the two sets of lines, aft of the first-mentioned intermediate point, until the side members and the lines are wound in large measure upon the outboard drums; snubbing the second set of lines at a point aft of the drums, and then slacking back the second set ahead of the point where they are snubbed; shifting the now slack portion from the outboard drums onto the central drum; and continuing the reeling in of the second set of lines, and the side members, onto the central drum, meanwhile releasing the second set of lines at the point where they were snubbed.

4. A method as in claim 3, which includes the step of releasing the forward portion of the first set of lines from the after portion common to the two sets of lines, after connection of the initially slack portion of the second set to its outboard drum, and assumption of the load by the second set, to pull slack in the first set of lines forward of the first-mentioned intermediate point.

5. A method of hauling a trawl net such as includes side members extending forwardly from the respectively opposite sides of a net body to a pair of spaced apart doors, onto a winch aboard the trawler which has a central drum and two outboard drums at the opposite ends of the central drum, by means of a first set of lines extending from the winch to the net body and which includes the doors, and a second set of lines, each of which includes a hauling line, a slack lazy line terminating at its forward end at the door, and secured at its after end to portions of the first set of lines aft of the door, which method comprises: hauling the net body by the first set of lines until the doors are secured at the trawler; disconnecting the now accessible forward ends of the lazy lines from the doors, and leading them inboard over the stern to connections to the corresponding hauling lines, and thence to the corresponding outboard drums, to extend the second set of lines thence directly aft to the net body; hauling in the net by such second set of lines until slack has been hauled in the first set ahead of the net; disconnecting the slack portion of the first set from the net, leaving the second set tensioned; continuing to haul in by the second set until the latter, and the net side members, are largely wound upon the outboard drums; snubbing the net from the trawler, and slacking back the second set forwardly of the point of snubbing; passing the now-slacked second set, and the net side member, from the outboard drums onto the central drum; taking up the slack and releasing the snubbing; and completing the hauling of the net by winding it, to the extent necessary, onto the central drum.

6. A method of hauling a trawl net that includes a body and side members extending forwardly from the respectively opposite sides of the net body, onto a winch aboard a trawler which has a central drum and two outboard drums at the opposite ends of the central drum, by means of a first set of lines which incorporates towing warps extending aft from the trawler, a door at the end of each towing warp, and net line means extending from each door to the net body, each said net line means comprising a forward part extending rearwardly from the door to the vicinity of the forward end of the adjacent net side member, and an after part extending aft of the forward part to an intermediate portion of the net; and two second sets of lines, one at each side, each of which incorporates a hauling line wound upon one of the outboard drums, a lazy line extending slackly during trawling from each door aft to the vicinity of the forward end of the net side member related thereto, and at least the after part of the net line means in the first set of lines, aft of the forward end of the curtain, which method comprises: hauling the net by the first set of lines until the doors are secured at the opposite side rails; disconnecting the forward end of each lazy line from the now-accessible doors, and leading the same inboard over the stern, to connect with the hauling lines, and so to complete the second set of lines extending directly aft over the stern to the net body; hauling in by the second set of lines to pull slack in the first set of lines; disconnecting the forward part of the net line means of the first set, behind the door and ahead of the curtain, from the after part of said net line means, extending aft of the forward end of the net side member; resuming hauling in by the second set of lines, over the stern, until the net side members and lines are largely wound upon the outboard drums; snubbing the second set of lines, aft of the winch, to the trawler; slacking back on said lines to pull slack ahead of the snubbed portion; passing the slacked portion and the net side members from the outboard drums onto the central drum; and resuming the hauling until the net body, to the extent necessary, is wound upon the central drum, and its pursed after end is on deck.

7. A method as defined in claim 6, for hauling a net onto a trawler which has a pair of laterally spaced apart guide posts at each side of its stern, with each pair of posts being aligned generally with the outboard drum on their side of the trawler, for guidance of the lines onto the latter and with each pair of guide posts comprising a normally upstanding outboard post and a normally upstanding inboard post that is retractable into a position out of the path of the net, which method includes further: leading each released lazy line forwardly over the stern between the pairs of posts on its side of the trawler; and, as the bosom of the net approaches the guide posts, retracting the inner post of each pair to permit passage forwardly of the net body between the two upstanding outboard posts and onto the central drum.

8. A method as defined in claim 7, wherein the guide posts of each pair are too closely spaced laterally to permit passage of a bulge in the net side members, which method includes the steps of depressing the inboard post of either pair to permit passage of such a bulge; steering the trawler to the side corresponding to the depressed post, to urge the net side member against the outboard post of the same pair, and to clear the net side member from the depressed post, and raising the depressed post to reestablish guidance of the net side member and lines between the paired posts, for further hauling in.

9. A method of hauling a trawl net which includes side members such as curtains or the like extending forwardly at each side of the net, onto a winch aboard a trawler, having a central drum for reeling in the net and concentric outboard drums for reeling in the side members, said method comprising hauling at least part of the side members onto the respective outboard drums, transferring the aft portions of the side members onto the central drum, and completing the hauling in of the net onto the central drum.

10. A method of hauling a trawl net which includes side members such as curtains or the like extending forwardly at each side of the net, onto a winch aboard a trawler, having a central drum for reeling in the net and concentric outboard drums for reeling in the side members, said method comprising hauling at least part of the side members onto the respective outboard drums, leading the unreeled portions of the side members inwardly off the outboard drums and onto the central drum, and completing the hauling in of the net onto the central drum.

11. A method of hauling a trawl net which includes side members such as curtains or the like extending forwardly at each side of the net, onto a winch aboard a trawler, having a central drum for reeling in the net and concentric outboard drums for reeling in the side members, said method comprising hauling at least part of the side members onto the respective outboard drums, snubbing the respective sides of the net to the trawler to assume the strain of the net, slacking back on the side members and transferring the aft portions of the side members onto the central drum, rotating the drum to again assume the strain, releasing the snubbed net, and completing the hauling in of the net onto the central drum.

(References on following page)

References Cited by the Examiner

UNITED STATES PATENTS

| | | | |
|---|---|---|---|
| 629,115 | 7/1899 | Turney. | |
| 777,122 | 12/1904 | Miller | 254—185 |
| 1,601,893 | 10/1926 | Vigneron | 43—9 |
| 1,621,714 | 3/1927 | Dyer et al. | |
| 1,863,989 | 6/1932 | Liisanantti | 43—8 |
| 2,555,676 | 6/1951 | Clark | 43—8 X |
| 2,579,787 | 12/1951 | Burney | 43—8 |
| 2,816,385 | 12/1957 | Luketa | 43—9 |
| 2,954,209 | 9/1960 | Luketa | 43—8 X |

FOREIGN PATENTS

| | | |
|---|---|---|
| 628,148 | 6/1927 | France. |
| 240,083 | 9/1925 | Great Britain. |

OTHER REFERENCES

World Fishing, October 1961, pages 28, 29 and 35, "The Case for the Stern Ramp."

SAMUEL KOREN, *Primary Examiner.*

F. RAY CHAPPELL, ABRAHAM G. STONE,
*Examiners.*